March 17, 1936.    J. A. H. BARKEIJ    2,034,368
INTERNAL COMBUSTION ENGINE
Filed Jan. 26, 1928    2 Sheets-Sheet 1
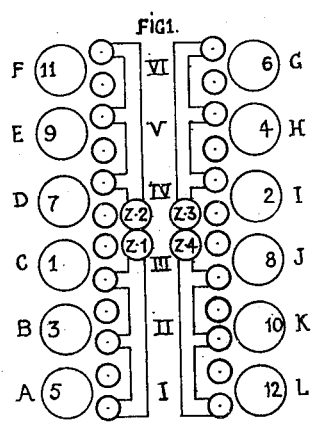
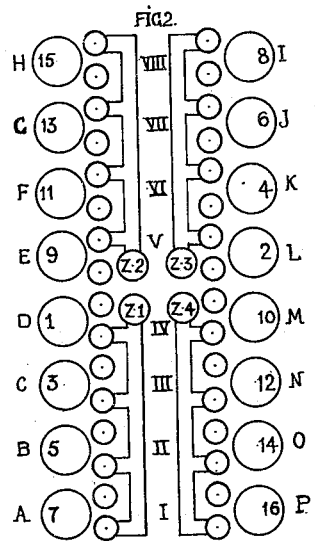
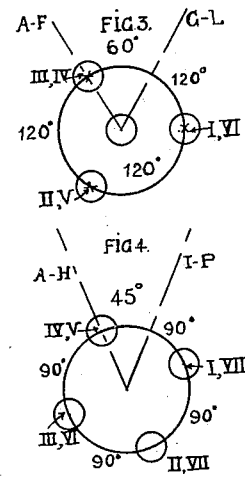
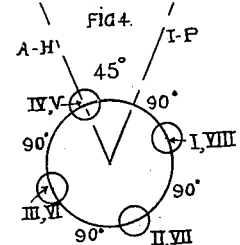
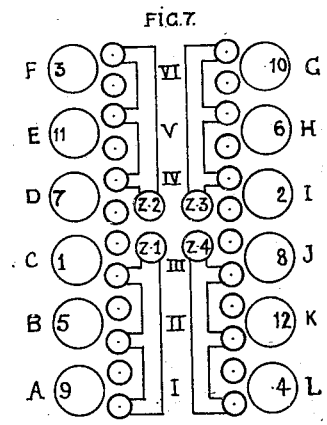
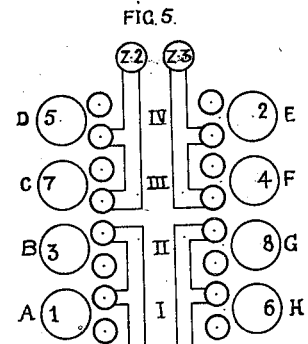
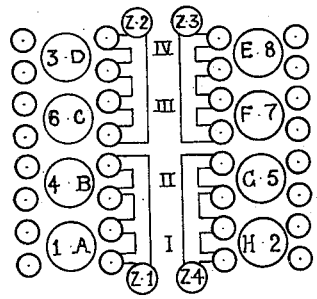
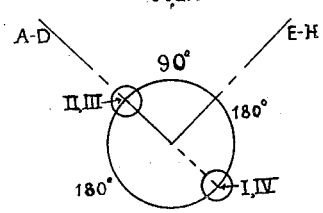
Inventor
J. A. H. Barkeij March 17, 1936. J. A. H. BARKEIJ 2,034,368
INTERNAL COMBUSTION ENGINE
Filed Jan. 26, 1928 2 Sheets-Sheet 2
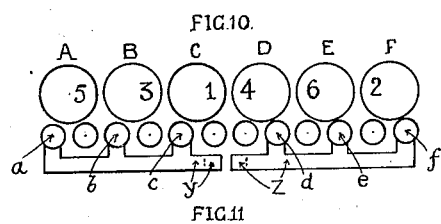
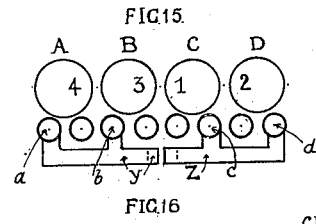
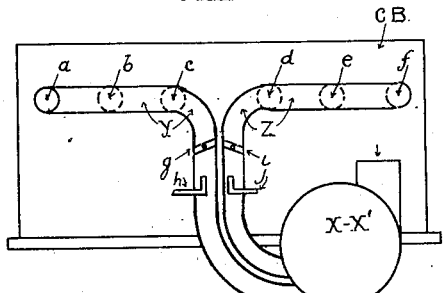
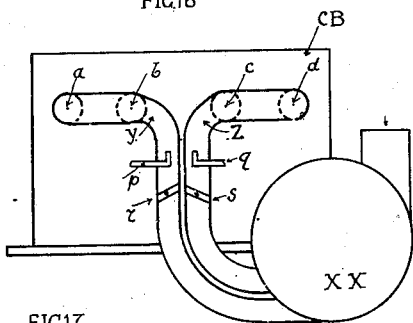
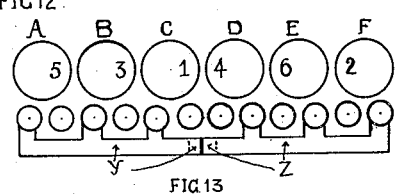
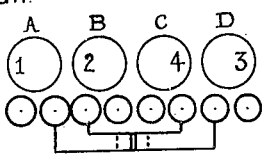
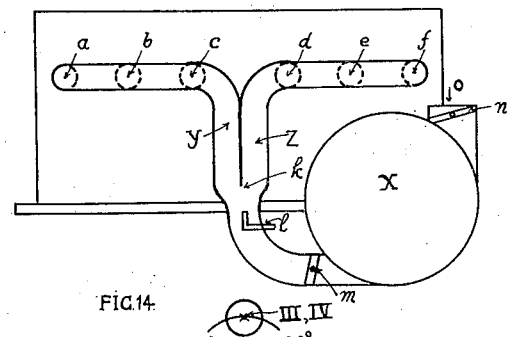
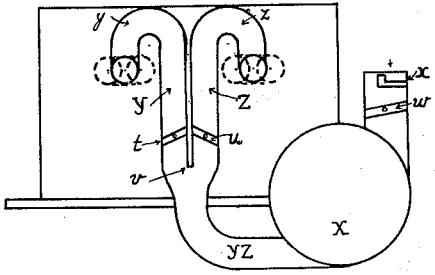
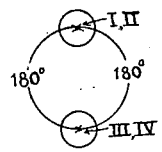
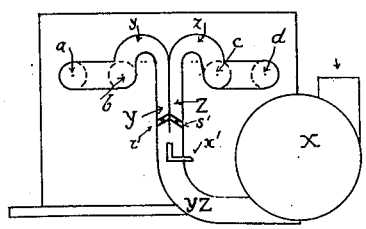
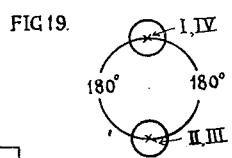
Inventor
J.A.H.Barkeij Patented Mar. 17, 1936

2,034,368

UNITED STATES PATENT OFFICE 2,034,368

INTERNAL COMBUSTION ENGINE

Jean A. H. Barkeij, Altadena, Calif., assignor to George C. Arvedson, New York, N. Y.

Application January 26, 1928, Serial No. 249,756

2 Claims. (Cl. 123—119)

The present application is a continuation in part of my applications, Serial No. 56,323 filed September 14, 1925 and Serial No. 44,128, filed July 16, 1925.

My first object is to arrange the suction orders and manifolding so that the successive suction periods are progressive in one direction, in order to use the momentum of the gases to increase the volumetric efficiency of all the cylinders together and of the cylinders individually.

My second object is to arrange the manifolds and suction orders so that the suction periods are partially or continuously in one direction, in which the gases move in the manifold.

My third object is to connect the cylinders of an internal combustion engine with a single manifold and single fuel mixing means, but so that half the number of the cylinders is connected with one branch and the other half with the other branch, each half of said cylinders having overlapping suction periods. A single riser is divided into said two branches before said branches bend to the right and left to the cylinder openings. (See Figs. 13, 18 and 20.) It is at the same time a similar object to feed each group of cylinders having overlapping suction periods with a separate carburetor. With two or more carburetors, the cross-section of the inlet manifold can be smaller than in the former case, where two or more of such groups are fed by a single carburetor. (See Figs. 1, 2 and 5.)

My fourth object is to combine the aforesaid objects with an arrangement of crankpins whereby the primary inertia force of the reciprocating parts are completely balanced and in some cases the secondary inertia forces also.

My fifth object is to combine the first and third objects in the same arrangement with or without the second object.

My sixth object is to combine one or all of said objects with equal spacing between the various cylinders of one group.

My seventh object is to combine either one of the first two objects, together with one or more of the other objects, with a manifolding which retains the effects of either one of said first two objects and can be combined with a single supercharger or compressor.

Fig. 1 represents an engine with twelve cylinders, A—L, arranged in two groups of six cylinders disposed at an angle of 60° as can be seen from Fig. 3, each group of three cylinders being connected with one carburetor, Fig. 2 shows an engine with sixteen cylinders arranged in two groups of eight cylinders at an angle of 45° as indicated by Fig. 4, each group of four cylinders being connected with a single carburetor, Fig. 3 shows a crankpin arrangement for the engine illustrated in Fig. 1, and shows crankpins I and VI aligned, the crankpins II and V and crankpins III and IV being respectively spaced 120°, Fig. 4 shows a crankpin arrangement for the engine illustrated in Fig. 2, the crankpins I and VIII and crankpins III and VII being aligned in pairs opposite each other in one plane, while the crankpins II and VII and crankpins IV and V are aligned opposite each other in a second plane, substantially perpendicular to said first plane, Fig. 5 represents an 8 cylinder engine having cylinders arranged in two groups of 4 cylinders at an angle of 90° as indicated by Fig. 6, each group of 2 cylinders being connected with one carburetor, Fig. 6 represents the crankpin arrangement of Fig. 5, crankpins I and IV being aligned opposite the crankpins II and III in one plane, Fig. 7 represents an engine with 12 cylinders in two groups at an angle of 60°, as can be ascertained from Fig. 3, each group of 3 cylinders being connected with a single carburetor.

Fig. 8 represents an 8 cylinder engine, having cylinders arranged at an angle of 90° as can be seen from Fig. 9, each cylinder having two exhaust valves and two inlet valves, the inlet valves being shown between the groups of cylinders, the exhaust valves on the outside of the two groups. Two inlet valves of one cylinder may be siamesed as shown for cylinders A, B, H, G, or each inlet valve may be connected with a separate branch to the main branch as shown for the cylinders C, D, E, F. Each group of two cylinders is connected with one carburetor.

Fig. 9 shows the crankpin arrangement of the crankshaft for the engine of Fig. 8. Crankpins I and IV are placed opposite each other in one plane, crankpins II and III in another plane perpendicular to said first plane and so that crankpin II lies between crankpin I and IV, to the right of crankpin I.

Fig. 10 shows a straight six cylinder engine having cylinders arranged in a left and right group of 3 cylinders each, one carburetor being connected with one manifold and cylinders A, B, C and one carburetor with one manifold and cylinders D, E, F.

Fig. 11 shows the same engine with two manifolds, and with two blowers, one connected with the end of each manifold. One blower X is hidden entirely behind the outer blower located on the background. It may however, also be supposed that both manifolds enter the same blower without merging into each other before the blower as shown in Figs. 13 and 18.

Fig. 12 shows the same engine as Fig. 10, though all the cylinders are connected with a single manifold, with two branches, one to the left for cylinders A, B, C, one for cylinders D, E, F.

Fig. 13 shows that the two branches merge into one, which is provided with a single blower at the end thereof.

Fig. 14 shows the crankpin arrangement for these two latter engines and is similar to that of Fig. 3, with this difference that this shaft is called a left handed shaft, that of Fig. 3 a right handed shaft.

Fig. 15 shows a straight four cylinder engine having cylinders arranged in two groups, each group of two cylinders being connected with one manifold and one blower.

Fig. 16 shows each manifold connected to a separate blower, one named X', behind the one named X. It may however be supposed that it is one blower, provided the two manifolds enter separately into said single blower with a single impeller, like discussed for Fig. 11.

Fig. 17 shows a four cylinder engine with two groups of two cylinders, a left and right group, each group connected with a separate branch of a single manifold.

Fig. 18 shows the two manifolds merging into one and connected with a single blower.

Fig. 19 shows the crankpin arrangement for the engines of Figs. 15–18, crankpins I and IV being aligned opposite the aligned crankpins II and III in one plane, 180° apart.

Fig. 20 shows a four cylinder engine, arranged in a left and right group of two cylinders, the left group being connected with one branch and the right group with another branch, said branches merging into one and fed by a single blower.

Fig. 21 shows the crankpin arrangement for the engine of Fig. 20. This arrangement whereby crankpins I and II are aligned opposite crankpins III and IV in one plane, 180° apart, does not insure balance for a straight four cylinder, but is supposed to be applicable, if the groups of two cylinders are multiplied, longitudinally or radially.

With reference to the accompanying drawings, I will discuss successively the group of Figures 1 to 6, the groups 7 to 9, and the group of Figures 10 to 21. Referring to the first group, Figs. 1, 2 and 5 show respectively the arrangement of a 12, 16 and 8 cylinder engine, the cylinders being arranged in two groups at an angle of 60°, 45° and 90° respectively. Figs. 3 and 4 show the respective arrangement of the crankpins, the former figure showing the crankpins aligned in pairs so that crankpins I and VI, II and V, and III and IV are at an angle of 120° to each other, while in Fig. 4 the crankpins are aligned in pairs so that crankpins IV and V are opposite II and VII in one plane and crankpins I and VIII are opposite crankpins III and VI in another plane perpendicular to the first plane.

In Figs. 1, 2 and 5, the letters A—P indicate the cylinders successively. The reference numerals 1–16 indicate the specific suction order and the Roman letters represent the relative positions of the crankpins with respect to the angle of the banks of cylinders.

In Fig. 3 the left group of cylinders are at an angle of 60° to those of the right group. In Fig. 4 they are at an angle of 45° and in Fig. 6 they are at an angle of 90°. It is however, not necessary that this angle be exactly as said, provided the suction and firing order is compatible with the exact arrangement of cylinders and crankpins shown, or those of similar arrangements, incorporating the same objects. Said arrangements are well known in the art and it is equally well known that said arrangements allow a wide variation in suction and firing orders.

It is also well known in the art to apply one or more carburetors to said engine.

The present invention however proposes a new specific arrangement of manifolds and suction orders, whereby the volumetric efficiency of all the cylinders combined is considerably increased by using the following method.

In Fig. 1 the cylinders A, B, C form one group, and so do the cylinders D, E, F; G, H, I; and J, K, L. The figures in the circles representing the cylinders, show that the suctions are from the carburetor first to the nearest cylinder C, then to the next cylinder B and finally to cylinder A. The gases having required a certain momentum in the direction of cylinder C, retain said momentum towards the cylinder B and finally towards the cylinder A. The interval between two suctions will be 120° and the inlet period takes approximately at 225°. The two suction periods will overlap about 105°. The same conditions obtain for the three other groups. The overlapping of the suction periods have a tendency to maintain the speed of the gases at a maximum.

In Fig. 2 the same conditions obtain in a varying degree for the 16 cylinder, in which each group is formed by four cylinders and in which the overlapping period is increased to 225°—90°=135°. In Fig. 5 the interval between successive overlapping suction periods is smaller and only 225°—180°=45° approximately. Later on will be discussed the same method in combination with non-overlapping periods. Another object closely related to the explained figures will be explained first.

To incorporate my third object, I follow the following method. Assuming the expansion period as 135°, two expansions in an 8 cylinder overlap each other 45°, in a 12 cylinder 75°, in a 16 cylinder 90°. The further a cylinder is removed from the end of the crankshaft where the flywheel is and where the power is taken from the engine and the more crank throws the explosion power to act on, the more bending moments will be caused in the intermediate crankpins and crankarms and the more pure torsion in the intermediate journal pins and the more will the crankshaft twist as a whole during every separate explosion and twist back when the peak of the pressure has been reached during that particular explosion. We can make tables representing the number of crank positions through which the driving force of two or more overlapping power strokes have to act before they reach the transmission shaft or propeller. We assume that the flywheel is at the upper end of the engines as they are shown in top view in the drawings.

It appears that the best arrangement of the firing order with respect to torsion of the shaft coincides with the suction order whereby, by a certain arrangement of the manifolds, advantage can be taken of the inertia of gases to increase the volumetric efficiency of the engine. For the 8 cylinder engine these firing and suction orders cannot be made to coincide together with an arrangement whereby the reciprocating parts are balanced for the primary inertia forces.

The second group of Figs. 7–9 inclusive show the same fundamental arrangement of progressive suction orders as those of the first group, here however, the suction periods do not overlap for each group. The crankpin arrangement for the 12 cylinder shown in Fig. 7 is the same as that shown in Fig. 3 for the 12 cylinder of Fig. 1. The progressive suction order shown in this Fig. 7 differs from that shown in Fig. 1 in that the suction periods of the individual cylinders of each group do not overlap each other.

In Fig. 8 the same difference is shown for the 8 cylinder engine, though the crankpin arrangement has to be different to effect this result. If the crankpins are arranged in two pairs of aligned crankpins in the same plane, the intervals between suction periods in the two cylinders of one group are respectively 180° and 540°, consequently they have to overlap, though they may be non-progressive.

For the arrangement of crankpins shown in Fig. 9 the suction order can, if desired, be made non-overlapping in the same direction. (270°–450° respectively. Progressively and "in the same direction" are not identical.) The same condition can even be obtained for the 16 cylinder engine, if the crankshaft consists of two halves equal to the shaft shown in Fig. 9. There is an interval of 270° and the two suction periods can hardly overlap. It is however considered superfluous to illustrate this, and the two Figs. 7 and 8 are deemed sufficient to illustrate this possibility. Progressively always includes "in the same direction" but not conversely.

In this arrangement of progressivity the gases do not come entirely to a standstill, but create certain regions of higher compressed gas on account of the inertia of the gases in the same directions, and the locations of these regions are entirely different from those created when the suction orders are not progressive and have for that reason a decisive influence on the volumetric efficiency at certain speeds.

In Fig. 7 the progressivity is again shown from the approximate center to the ends of the engine, but can be changed, if desired, by changing the suction order. Accordingly the position of the carburetor may be on the ends of the engine, as the non-overlapping periods are equal between all suction periods. The period between the suction of cylinders A and C is equal to that between cylinders C and B, B and A. In Fig. 8 the progressivity is as shown in Fig. 5 from the ends towards the center of the engine. Here again the direction can be changed without changing the method.

It is understood that the different manifolds can be connected with a single compressor or a plurality of compressors. In Fig. 5 the manifolds are shown in opposite directions so that the two pairs of two manifolds may be connected each with a separate blower driven from each end of the shaft. Any arrangement for any number of groups, provided the direction of the axis of the main conduit is in the direction in which the gases move in said conduit, will be within the scope of this application, provided the suctions are either progressive or overlapping, or both.

The third group of drawings, Figs. 10–21 represent this method of gas distribution applied on 4 and 6 cylinders more adaptable for automobiles. It is, however, understood that the following method can be equally applied on longer in line engines with 8, 10, 12 cylinders, as already shown by me in the following patents: 1,722,950 issued July 30, 1929 and 1,809,923 issued June 16, 1931; and applications, Serial Numbers 753,609, filed December 3, 1924; 56,323, filed September 14, 1925; and Serial No. 101,715 filed April 13, 1926.

Figs. 10–13 show the different arrangements of the suction orders, manifolds and blowers within the scope of this method as applied on a six cylinder engine. Fig. 14 shows again the standard arrangement of the crankpins.

Figs. 15–18 show the different arrangements of the suction order manifolds and blowers according to the proposed method as applied on a four cylinder engine. Fig. 19 and Fig. 21 show the arrangement of the crankpins.

In Fig. 15 the suction order is C, D, B, A, in Fig. 17 is shown the other suction order, A, B, D, C. Both of these suction orders may be obtained with the crankpin arrangement as shown in Fig. 19 in which crankpins I and IV are aligned opposite the aligned crankpins II and III. In Fig. 21 the crankpins are differently arranged and different suction orders may be obtained with such arrangements. (Firing order A, C, D, B or A, D, B, C.)

In Figs. 10 and 11 one sees, that the six cylinders are divided in two groups, a right and left hand group. For each group the suction is progressive. The suctions do not overlap in each group unless the duration of the suction periods are more than 245°. The cylinders A, B, C are connected by individual branches to a main conduit Y and the cylinders D, E, F to a main conduit Z. The letters $a$–$f$ indicate the inlet valves or separate inlet openings in the cylinder block CB. The two main conduits have each a throttle $g$ and $i$ above the fuel nozzle and each conduit is connected with a separate centrifugal blower X and X' arranged on the same shaft and driven by the engine shaft. The blowers are however shown one behind the other so that the blower in the foreground totally obscures the blower X' in the background. They may however, be considered as being one blower with an impeller so that the two conduits Y and Z enter the blower individually.

Preferably, the duration of the suction period of each cylinder in the engine of Figs. 10 and 11 are about 225°, and thus the cylinders of the same group do not have overlapping suction periods, since the interval between the suction periods of the same group is 240° of crankshaft rotation. In some instances it is found practical and desirable to provide a suction period having a duration of more than 240°, in which event the suction periods of the cylinders in the same group will overlap. The blower has time to build up a pressure in front of the inlet valves of the group and when a valve opens the pressure will be released and will compensate sudden increase in volume between blower and respective piston at certain speeds and prevent too great a decrease in pressure when the piston has its maximum speed so that the gas can follow the speed of the piston. The pressure is preferably built up 3 times for every two revolutions of the engine for each group of three cylinders.

In Figs. 12–13 a slightly different arrangement is made. The two manifolds merge at a relatively considerable distance from the first inlet opening into a common conduit in which is located only one fuel jet near the merging point. A throttle $m$ is placed before the jet and after the blower, and a second throttle $n$ is placed at the air entrance of the blower. The two throttles $m$ and $n$ can be operated simultaneously if so desired. The suction periods are here overlapping for the two manifolds.

In the six cylinder engine of Figs. 13, 14, the suction periods overlap in the inlet opening of the manifold in advance of the dividing point $k$, where such suction periods take place in excess of 120° since these periods come with regular intervals of 120° for the crankpin arrangement of Fig. 14. If the suction periods are about 225°, the same thing happens. The cylinders A, B, C, have suction periods with intervals of 240° and also cylinders D, E, F. Therefore if the duration of the suction periods was in excess of 240°, the suction periods would overlap also in the two branches past the dividing point $k$ in said branches. 65° is not too much for the inlet gases to rush into the cylinder against the upgoing piston at high speed engines, as the piston has not yet a very great speed at 65° past bottom center position. In the six cylinder with a suction order and firing order of 1, 5, 3, 6, 2, 4, the suction periods alternate to the left and to the right half of the cylinders. In the four cylinder engines conditions are somewhat different. The suction periods do not alternate from the left to the right half of the engine, due to the crankpin arrangement of Fig. 19. However, if the suction periods are longer than 180° they overlap in the manifold before the point $v$. The same thing occurs in Fig. 20.

The suction periods are again progressive for each group. A blower of the same capacity as the one shown in Fig. 11 would not be able to build up the same pressure in the common manifold as they build up in one manifold on account of the non-overlapping arrangement of the greater number of cylinders to be fed by a single supercharger.

In Figs. 15 and 16, the parallel arrangements are shown for the four cylinder engine, though the conditions are here entirely different. The suction periods for each group of two cylinders is always overlapping 225°−180°=45° for the groups A, B and C, D.

Jets $p$ and $q$ are respectively located in each manifold. The two conduits are again separately connected with two blowers in tandem on the same shaft. They can build an overpressure only once for every two revolutions of the crank for each group of two cylinders and the throttles are preferably placed between the jets and blowers.

In Figs. 17–18 a slightly different arrangement is illustrated. The inlet ports are siamesed and the importance of progressivity is eliminated, the overlapping and same direction of flow being now only of importance. The two manifolds are curved upwards to drain the heavy ends of the fuel in the cylinders, as is well known in the art to prevent too great an accumulation of unvaporized fuel in the manifold. The jet $x$ is placed at the entrance of the blower so that the pressure of the blower does not have to be transferred to the carburetor, the throttle $w$ being placed between the jet $x$ and the blower X, and two throttles $t$ and $u$ are placed respectively in the conduits Y and Z. The two manifolds Y and Z merge again into a single manifold YZ, which is connected to the blower X. The suction periods are here intermittently overlapping in each group of two cylinders and continuously for the single group of four cylinders. The blower has no chance to build any temporary overpressure as in the arrangement of Fig. 16, unless the capacity of the blower is very great, in which case however, more power would be absorbed for this supercharging. The periods of overlapping here are however only 45°. In the arrangement of Fig. 13 for the 6 cylinder they are 105°.

In Fig. 13, if the suction periods are only 225°, the cylinders $a$, $b$, $c$ have suction periods which do not overlap, unless the suction periods are made longer than 240°, which may be done in high speed engines in which the inertia of the inlet gases is sufficient to fill the cylinder notwithstanding the 65° of the upgoing piston. Crankpins 1, 2, 3, (correlative with inlet openings $a$, $b$, $c$ of cylinders $a$, $b$, $c$,) have always suction periods with 200° interval. The suction periods, however, in the inlet pipe before the point $k$, where the inlet is divided into two branches, are always overlapping even if they are only 180°, or even only 121°, as the intervals are 120°. In the four cylinder engines, as shown in Fig. 18 and Fig. 20, the suction periods of cylinders A and B overlap if they are about 225°. The same thing happens for cylinders C and D, equally in Fig. 18 as in Fig. 20. In the four cylinder engine, the suction periods do not alternate from the left to the right; in the six cylinder they do.

In Figs. 7–8 and Figs. 10–13 the suction periods of the cylinders belonging to one group do not overlap each other as the intervals between the various suctions is always 240° for a 6 cylinder, and they will always be progressive. In Fig. 5 however, the suction periods are overlapping and progressive and the cylinder nearest to the carburetor or intake opening should be the one receiving the charge after the interval during which two successive periods do not overlap each other. Consequently in Figs. 1, 2, 5, 15–18 where the suction periods overlap the length of the intervals between the periods should be considered in relation to the cylinder receiving the charge after the period of non-overlapping. In Figs. 17–18 it is however immaterial whether the suction order is as shown in Fig. 15, C, D, B, A or as shown in Fig. 17, A, B, D, C. If the cylinder A receives the charge first after the interval of non-overlapping the cylinder B will receive the benefit of the inertia of gases, if the order is the reverse cylinder A will receive the benefit. Experiments have however shown that for the arrangement of Fig. 18, in which the ports are siamesed the difference of volumetric efficiency is negligible for the cylinders of each pair of cylinders. However, the total volumetric efficiency of this system is greater than that of a single manifold for four cylinders, in which the suction periods of the two pairs of cylinders oppose each other twice per two revolutions or once per revolution of the engine. This arrangement is further superior to a standard manifold branched twice in two directions for two sets of two adjacent cylinders, as in this construction the suction of one cylinder opposes that of the adjacent one and the inertia force is partly lost for the other cylinder. It is further of great importance to merge the two manifolds into one as shown, as the fuel in the jet will flow much more regular when subjected to overlapping suction periods than subjected to the jerking action of unequal intervals of overlapping and non-overlapping periods. If the point of merging of the two separate manifolds is far enough removed from the siamesed ports of the two groups of cylinders the opposing suction will not have the influence it has in the standard construction in which a single riser with a single jet divides itself into two branches, one to the right and one to the left. The supercharger can of course be omitted here as in the other cases.

The same advantage is obtained for the six cylinder engines by incorporating the merging of the two manifolds into one at a considerable distance down into the riser, as shown in Fig. 13.

Heretofore, in the art, it has been always the custom to arrange the suction periods of cylinders belonging to one group so that the periods did not overlap each other. This was done to obviate the disadvantages of opposite suction periods in opposite direction. However, no attention was paid to the direction of the non-overlapping periods, which might oppose each other even in a manifold connected to cylinders having no overlapping suction periods, nor was attention paid to the fact that such opposite suction might occur even when the suction periods do overlap.

It is understood that the fuel mixing means for the various manifolds can be dispensed with in the case of Diesel and semi-Diesel engines. A greater air charge means more power.

It is further understood that this method of gas distribution may be equally applied on engines having more than one bank of cylinders, or on engines having its cylinders arranged radially. Furthermore, each cylinder may have more than one inlet valve and these valves may be located in the cylinder head or adjacent to the cylinder.

Fig. 20 shows that the progressive arrangement of Fig. 16 can be combined with the merging of the manifolds into a single duct with or without a blower, and then be combined with the arrangement of crankpins of Fig. 21. It is, of course, understood, that the present arrangements to increase the volumetric efficiency of the cylinders of multiple cylinder internal combustion engines are equally applicable on engines of the Diesel type or other engines of the fuel injection type in which the carburetors are dispensed with and replaced by means which inject fuel at the end or towards the end of the compression period of a four stroke cycle engine, as proposed for the present carburetor engines.

What I claim as my invention is:

1. In a multi-cylinder engine having at least four cylinders divided into two groups of cylinders, an intake manifold structure including a main conducting portion and a pair of branch conducting portions each connected with one of said groups of engine cylinders and with said main conducting portion, a blower having an inlet and an outlet, said blower outlet connected with said main conducting portion, regulable valve means associated with the blower inlet, regulable valve means associated with said main conducting portion for controlling the delivery of fluid from said blower into said manifold structure, and means for introducing a combustible fluid into said main conducting portion beyond the last mentioned regulable valve means associated therewith for mixture with fluid flowing therethrough prior to the division of said fluid stream and flow through said branch conducting portions.

2. In a multi-cylinder engine having at least four cylinders divided into two groups of cylinders, an intake manifold structure including a main conducting portion and a pair of branch conducting portions each connected with one of said groups of engine cylinders and with said main conducting portion, a blower having an inlet and an outlet, said blower outlet connected with said main conducting portion, regulable valve means associated therewith for controlling the fluid flow therethrough prior to the division of said fluid stream and flow through said branch conducting portions, said branch conducting portions each having a plurality of outlets communicating with the engine cylinders, that portion of said branch conducting portions intermediate the outlets and the junction with said main conducting portion extending substantially parallel and in the same direction as said main conducting portion lying intermediate the junction with said branch conducting portions and the point where said combustible fluid is introduced therein.

JEAN A. H. BARKEIJ.